Figure 7:
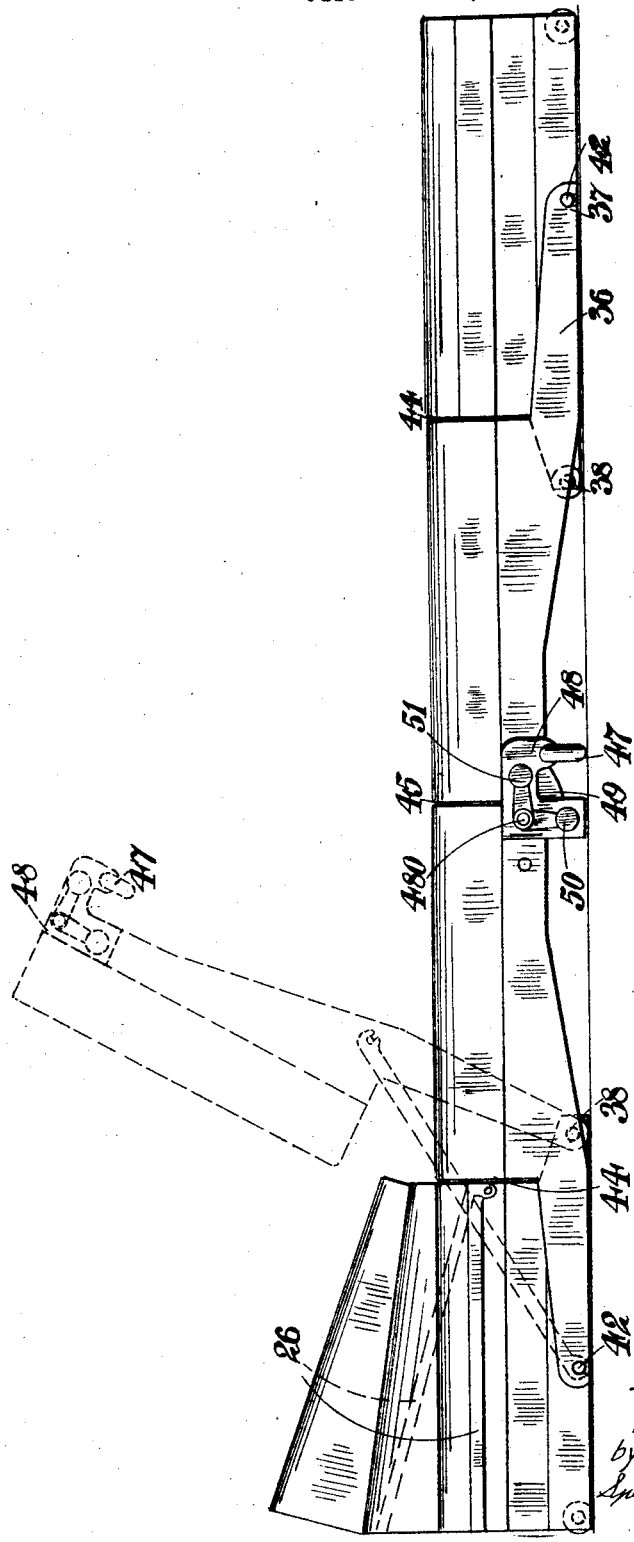

Feb. 19, 1929.
E. A. HELLSTRAND
1,703,004
ADJUSTABLE SEAT FOR VEHICLES
Filed March 4, 1926   3 Sheets-Sheet 1
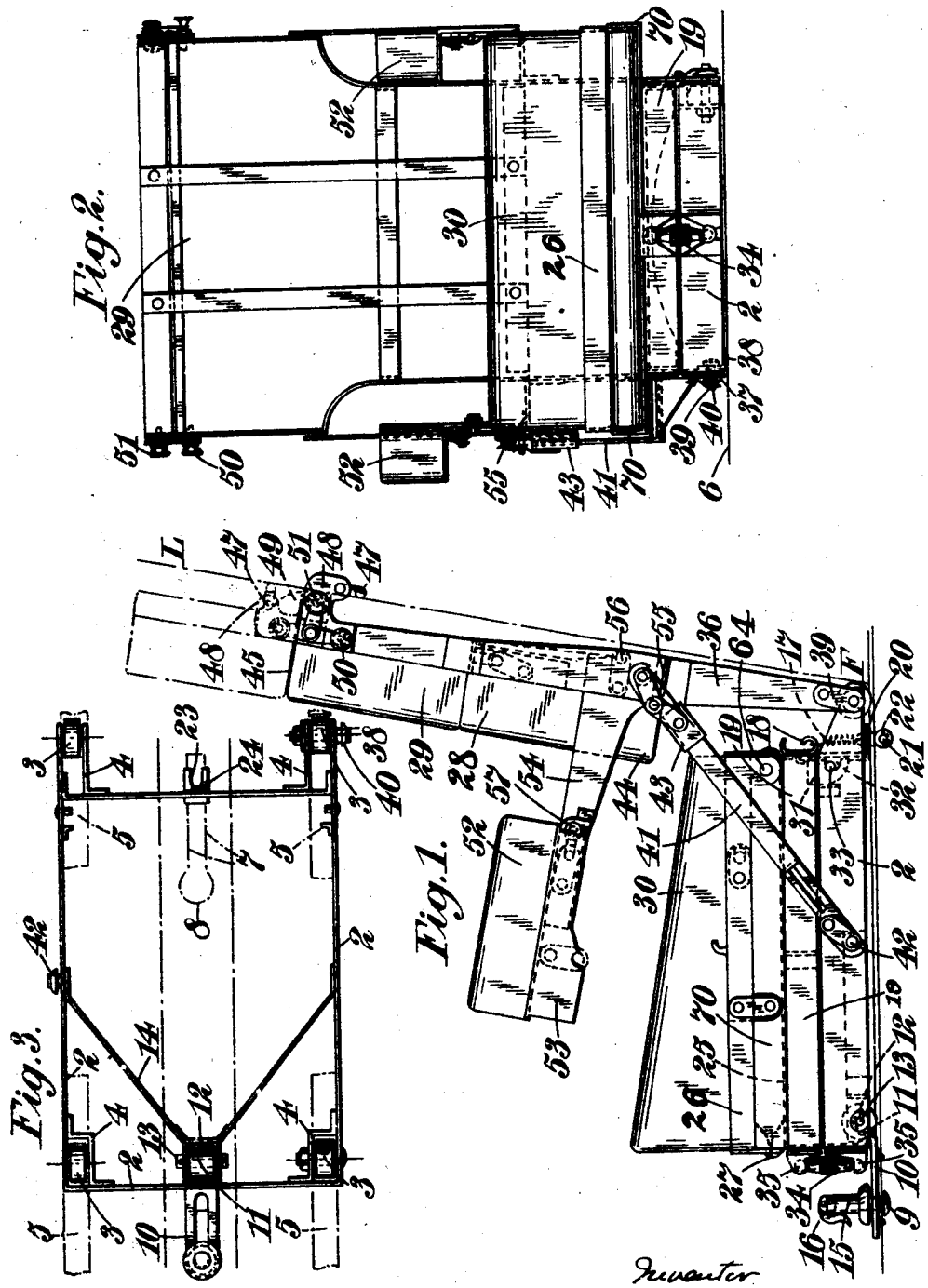

Feb. 19, 1929.  E. A. HELLSTRAND  1,703,004
ADJUSTABLE SEAT FOR VEHICLES
Filed March 4, 1926   3 Sheets-Sheet 2
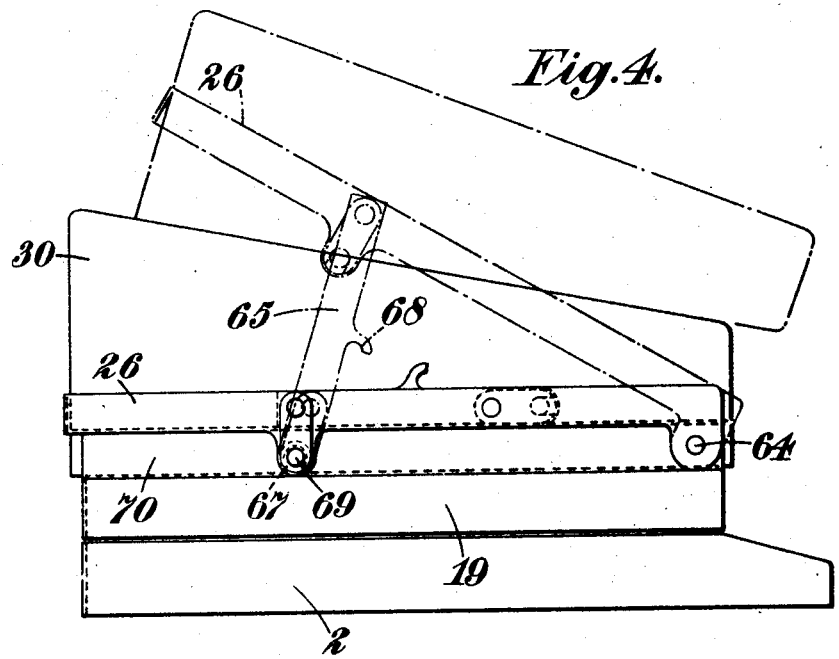
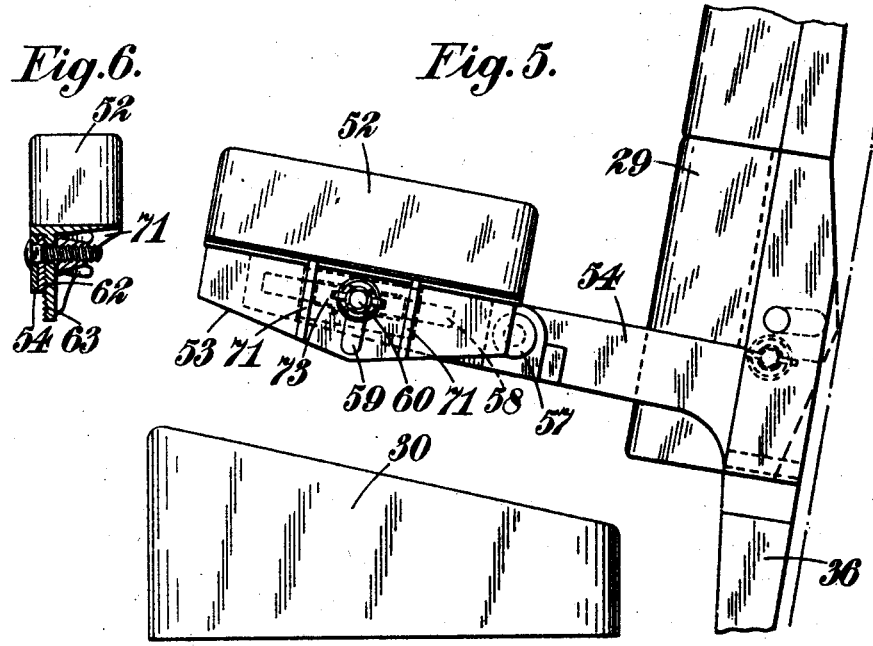

Feb. 19, 1929.

E. A. HELLSTRAND 1,703,004

ADJUSTABLE SEAT FOR VEHICLES

Filed March 4, 1926     3 Sheets-Sheet 3

Inventor
Edward A. Hellstrand
by
Spear, Middleton, Donaldson & Hill
Attys.

Patented Feb. 19, 1929.

1,703,004

UNITED STATES PATENT OFFICE.

EDWARD AXELSON HELLSTRAND, OF GUILDFORD, ENGLAND.

ADJUSTABLE SEAT FOR VEHICLES.

Application filed March 4, 1926, Serial No. 92,340, and in Great Britain March 11, 1925.

This invention relates to adjustable seats for vehicles. Seats of this kind are commonly detachably mounted on the vehicle floor and are adapted also to form couches or beds, and the object of the invention is to provide an improved construction of this type having certain advantages hereunder described.

According to this invention, the seat is secured by bolts detachable from it and extending through keyhole slots in the floor. Thus when the seat is removed its underside and the floor are devoid of projecting parts, as the bolts can also be removed through the large end of the slot.

Other features of the invention are comprised in the construction and adjustment means, particularly those for converting the seat into a couch or bed.

In the accompanying drawings,

Figure 1 is a side elevation of the seat showing, in dotted lines at the upper edge of the back, the manner in which the back of a seat behind it combines to form a couch when both parts are brought to a horizontal position, Figure 2 is a front elevation, showing the back rest minus its upholstery, Figure 3 is a plan of the base of the seat with the upper structure removed, Figure 4 is a fragmentary side elevation showing means for adjusting the seat when used as a couch, Figure 5 is a fragmentary view illustrating the arrangement of the arm rest, Figure 6 is an end view of the arm rest showing the adjusting and clamping means, and Figure 7 is a side elevation of the seat in extended position for use as a bed.

In one construction, the base of the seat is a strip of metal turned edgewise and forming a rectangular frame 2, in the corners of which are provided blocks forming runners, or if preferred rollers 3 carried by brackets 4 may be employed instead. Thin strips of metal 5 may be fixed to the floor 6 of the vehicle for the runners or rollers to travel upon. Intermediate of the two strips of metal, a long slot 7, (or if preferred, two slots, one on each end of the seat) is provided and is enlarged at one end 8 to allow the head of a fixing bolt 9 to pass through.

Obviously the bolt may engage directly with the metal framework of the seat, but preferably for the front end is provided a carriage or sledge formed of a strip of metal 10. One end of this is bent first upwards and backwards at 11 and then downwards at 12 to hook detachably over a short horizontal bolt 13 supported by lateral stays 14 of the frame 2. The other end of the sledge 10 which projects forwardly of the frame is provided with a hole and mounting 15 for the bolt 9, which may be of the quick acting eccentric type operable by the lever 16, or if preferred by a wing nut.

To secure the rear part of the seat, the preferred arrangement comprises a tension coil spring 17 adapted at its upper end to engage a hook 18 which may be either inside or outside (as shown) of an upper frame 19 described later. The lower end of the spring is attached to a bolt 20 passing through the slot 8 in the floor and provided with a T-piece 21 on which are mounted rollers 22 engaging within an inverted channel section longitudinal floor member. The bolt 20 is located by a guide slot 23 provided in a bracket 24 on the lower frame. The foregoing arrangement prevents the seat rattling on the floor or swinging sideways when unoccupied.

Also, the seat can be readily removed from the vehicle and the bolts detached from the slots so that the underside of the seat and the floor are each devoid of projections.

Surmounting the frame 2 is a second and deeper frame 19, above mentioned, which may be of wood, but preferably is of metal, and contains the springs or the like. These extend above the frame and are covered with material upon which the upholstered cushion is adapted to rest.

If the frame 19 is of metal, instead of containing the springs, it may have a flat top 25 with upturned edges 70, and a thin layer of rubber sponge or similar upholstery 27 forming an auxiliary cushion is attached to the flat top 25. The upper surface of the upholstery 27 will be level with the upholstery 28 upon the back rest 29 when the latter is laid horizontally to form a couch. The separate upholstered cushion 30 may be retained in place by means of a skeleton frame 26 hinged at 64 and referred to later.

This frame 19 is adapted to be adjustably inclined, as required, from its rear edge, and instead of hinges, it is provided with depending lugs 31, the front edges of which are curved, whilst the rear edges are notched at 32 to engage with studs 33 in the lower metal frame 2. These are engaged or disengaged by bringing the seat to a nearly vertical position, and when lowered to the desired inclination, the engagement at the rear edge is perfectly secure.

An alternative and preferred method of adjusting the inclination of the seat is to employ a right and left handed internally threaded sleeve 34, from which correspondingly threaded bolts protrude and at their free ends detachably engage the upper and lower frames 19 and 2 respectively by ball-and-socket or pin joints 35. If preferred, however, these bolts may have T-heads engaging with spring clips.

The adjustable back 29 of the seat is supported by side plates 36 of metal having a detachable pivoted engagement with the rear part of the under frame of the seat. For this purpose the lower end of the side plates is slotted at 37 to engage the pivots 38, and is provided with spring blades 39 adapted to snap over or otherwise engage a head 40 provided on the end of the pivot. The inclination of the back rest may be varied by means of an adjustable steel strip or a strap 41 on one or both sides of the seat, extending from the side part of the under frame 2. Two seats side by side may be closely arranged so that by removing their respective adjacent straps and the arm rests hereunder described, three persons can be accommodated on the two seats. The two back rests 29 can then be joined by means of parts permanently provided or detachably mounted.

Where the strap 41 makes use of the same pivot 42 in the lower frame 2 as is employed and later described in connection with the arrangement of the couch, the edge of the strap is always below the surface of the cushion 30 and consequently need not be removed when a third passenger is sitting in the centre of two seats arranged side by side. This, therefore, renders unnecessary the coupling of the two back rests. The strap 41 can be adjusted to vary the inclination of the back seat by forming it of two parts which overlap and have inter-engaging serrated faces retained in contact by means of a sleeve 43.

When it is desired to use the seat as a couch, the pivot connection of the back at 38 is disconnected and re-engaged with the other pivot 42 nearer to the front of the seat. In this position the lower edge 44 of the back is adapted to abut the rear end of the seat forming a continuous couch.

When two seats are used as a couch, the top edges 45 of the back rests, when folded into a horizontal position, as indicated in Figure 1 by reference to a line F, L, and in Fig. 7 abut one another in the centre of the couch, and are joined by means of a hook-shaped projection from the lugs of one back rest which hooks round the rug-rail of the other back rest, thereby forming the two seats into one rigid couch, which can be lifted up and moved by its extremities. In some cases, however, it is found more suitable to fix the rug-rail 47 on one seat by means of pivoting brackets 48, so that it can be hinged out on its pivot 480 to hook round lugs 49 projecting from the back of the other seat indicated by the dotted lines in Fig. 1 and full lines in Fig. 7, these brackets being secured in their respective positions by two threaded studs 50 and 51, and the top edges of the back rest which abut one another are thus located in that position by the two lugs 49 (one on each side of the back rest) projecting from the one and received in the crook of the brackets 48 provided in the other, and retained in that position by the two studs 50 and 51.

The seat is preferably provided with arm rests, and these may be pivotally connected to the supports 36 for the back rest. The upholstered portion 52 which forms the arm rest is mounted upon an angle plate 53, the underside of which may have a telescopic engagement with a projection on the arm 54 carried by the support 36. This joint allows the upholstered portion to be drawn off its supporting arm, turned upside down beneath the latter and re-engaged telescopically. In this position it is adapted to fold up against the upholstered portion of the back and exactly to fill a cut-away portion in the side of the latter adapted to receive it. Thus, when the back is folded down to form the couch, the upholstered portion of the arm rest fits exactly into the space provided for it, and a very neat and compact result is obtained.

In cases where the base frame is narrower than the back rest, the foregoing arrangement is not possible, and in such cases the projecting arm 54 will have a telescopic engagement with the back rest support 36, as shown by the guides at 55. It is held in position by a stud or bolt 56 and is provided with a hinge at 57, so that the part 53 can hinge or slide telescopically. The object of the hinge is to allow the padded part 52 of the arm rest to be raised against the back rest in order to facilitate reaching or leaving the seat. When the arm rests are not in use as such, the upholstered portion 52 fills the recess in the back rest, and the hinged projection 54 is stored conveniently in the door pocket or elsewhere. It can, if desired, be made to pivot and to fold up into the recess as well. The drawing also shows an alternative fixing of the padded portion to the extending arm, which provides a certain amount of horizontal and vertical adjustment. This comprises a longitudinal slot 58 in the part 54 and a transverse slot 59 in the part 53, together with a clamping bolt 60 extending through the arm 54 and gripping a metal locking piece 62 having a serrated face against serrations 63. On the side of the locking piece opposite the serrations is a ridge 73 engaging slidably the slot 58. A similar clamping arrangement may be employed to secure the arm 54 to the support 36, or to hold the arm rest in its recess when the seat is used as a couch.

To enable pillows and bedding to be kept in place respectively at the head and foot of the couch, the front and side portions 26 which retain the thick cushion 30 may be hinged as at 64, Figure 4, and provided with a strut 65 normally adapted to lie compactly against them, but when required for use adapted selectively to engage, by a slotted end 67 or a notched projection 68, with a pivot (similar to 42 and 13) on the upturned edge 70 of the top plate of the frame 19. Thus there are two inclinations to which the retaining frame 26 for the upholstered cushion 30 may be adjusted. The higher one will retain two thick cushions or pillows at the head of the couch and the lower one will be suitable to retain bedding and blankets at the foot of the couch, preventing it from moving off the latter.

From the foregoing it will be seen that the invention provides an exceedingly neat and easily adjusted seat for a vehicle, which is adapted readily to be converted into a couch in conjunction with a corresponding seat behind or in front of it, and furthermore is adapted to be wholly removed from the vehicle if desired and leaves the floor of the latter devoid of projections, and also itself has none on its underside.

Obviously, if preferred, various modifications could be made in the clamping means for adjusting the inclination of the seat and also in the adjusting means for the back rest, and for the latter's connection with the under frame of the seat.

What I claim as my invention and desire to secure by Letters Patent of the United States is:—

1. In a seat for a vehicle, the combination of a base adapted to be secured adjustably to the floor of the vehicle, a cushion supporting frame pivotally mounted at its rear end to said base to tilt on said base, an adjustable turnbuckle connection between said base and cushion supporting frame at their front ends for adjusting the amount of tilt, a second frame pivotally mounted at its rear end to said cushion supporting frame to tilt on the same, and struts pivotally connected to the said second frame and adapted to depend therefrom to engage the cushion supporting frame to support the second frame in tilted relation to the cushion supporting frame, said second frame embracing said cushion so that when adjusted to tilted position the cushion is elevated and tilted.

2. In apparatus according to claim 1 said cushion supporting frame having projections thereon adapted to be engaged by said struts to support the said second frame in adjusted tilted position, said struts each having a slotted end and a notched projection midway of its length adapted selectively to engage said frame projection to adjust said second frame to one of two inclinations.

In testimony wherof I have signed my name to this specification.

EDWARD AXELSON HELLSTRAND.